United States Patent Office
3,549,769
Patented Dec. 22, 1970

3,549,769
HALOGENATED BICYCLOHEPTENONES
William E. Bissinger, Akron, Ohio, assignor to PPG Industries, Inc., Pittsburgh, Pa., a corporation of Pennsylvania
No Drawing. Original application Aug. 16, 1967, Ser. No. 660,908, which is a continuation-in-part of application Ser. No. 574,548, Aug. 24, 1966. Divided and this application May 16, 1969, Ser. No. 839,760
Int. Cl. A01n 9/24
U.S. Cl. 424—331  7 Claims

ABSTRACT OF THE DISCLOSURE

The preparation of bicycloheptenones by the equimolar reaction of ketone or dihaloketene with cyclopentadiene is described. Halogenation of the bicycloheptenones thus produced yields biocidally active materials. Particularly described are the chlorinated products of the equimolar adduct of dichloroketene and cyclopentadiene.

CROSS-REFERENCE TO RELATED APPLICATIONS

This application is a divisional application of my application U.S. Ser. No. 660,908, filed Aug. 16, 1967, which is a continuation-in-part of U.S. Ser. No. 574,548, filed Aug. 24, 1966, now abandoned.

BACKGROUND OF THE INVENTION

The cycloaddition reaction of ketene with cyclopentadiene has been previously described. See, for example, Organic Reactions, volume 12, page 48 (1962). In copending, co-assigned United States patent application, Serial Number 221,337, now abandoned, it is disclosed that dihaloketenes can be generated in a chemically inert liquid medium and reacted in situ with olefins to prepare substituted alpha, alpha-dihalocyclobutanones. More specifically, it is disclosed therein that dihaloketenes can be generated by reacting a dihaloacetyl halide with a tertiary amine in a chemically inert, non-aqueous liquid medium and that generation of said dihaloketene is in the presence of an ethylenically unsaturated compound results in the formation of substituted cyclobutanones. When cyclopentadiene is utilized as the ethylenically unsaturated compound in the foregoing reaction, the products formed are alpha, alpha-dihalobicycloheptenones. As used in the specification and claims hereof, the term "bicycloheptenones" is intended to mean and include the cycloaddition product of cyclopentadiene with either ketene or an alpha, alpha-dihaloketene.

BRIEF SUMMARY OF THE INVENTION

This invention relates to halogenated bicycloheptenones and, in particular, relates to halogenated equimolar adducts of cyclopentadiene and a member selected from the group consisting of ketene and dihaloketene and compositions containing same. More particularly, this invention relates to chlorinated equimolar adducts of cyclopentadiene and dichloroketene.

DETAILED DESCRIPTION

It has now been discovered that halogenation of the aforementioned bicycloheptenones yields biologically toxic (biocidal) materials, e.g., fungicides, insecticides, nematocides, etc. In particular, it has been found that chlorinated alpha, alpha-dichloro-bicycloheptenones have insecticidal activity.

Bicycloheptenones employed to prepare the composition of the present invention are believed to be depicted by the following structural formula:

$$X\text{—}\overset{\overset{H}{|}}{\underset{\underset{}{|}}{C}}\text{—}\overset{H}{\underset{}{C}}\text{—}\text{—}CH$$

(A)

wherein X is hydrogen or halogen, e.g., fluorine, chlorine, bromine and iodine. Numbers adjacent to the carbon atoms represent the numbering scheme for nomenclature purposes. As shown in Formula A, the bicycloheptenone compound may be referred to as either bicyclo[3.2.0]-hepten-6-one, or as 7,7-dihalo-bicyclo[3.2.0]-2-hepten-6-one.

Bicycloheptenones can be prepared by any convenient method. Typically, they can be prepared by reacting cyclopentadiene and ketone or a dihaloketene on an equimolar basis. One method for the cycloaddition of cyclopentadiene with dihaloketene has been described in detail in copending, coassigned United States patent application Ser. No. 221,337, now abandoned. That application is incorporated herein by reference and, therefore, only so much of that disclosure as is necessary to understand this particular embodiment of the present invention will be repeated herein. A method describing the cycloaddition of ketene with cyclopentadiene is to be found in the above-recited references to Organic Reactions and that method and supporting information is incorporated herein by reference.

Briefly, the process described in the aforementioned co-assigned application described the reaction of a dihaloacetyl halide with a tertiary amine in the presence of cyclopentadiene. Substantial evidence indicates that the tertiary amine and dihaloacetyl halide form the corresponding tertiary amine hydrohalide and dihaloketene. It is further believed that in the presence of cyclopentadiene, the dihaloketene formed reacts with cyclopentadiene to form an alpha, alpha-dihalobicycloheptenone. While not intending to be bound thereby, it is believed that the above-described reactions can be represented by the following two equations:

$$X\text{—}\underset{H}{\overset{X}{\underset{|}{C}}}\text{—}\overset{O}{\underset{|}{C}}\text{—}X' + R_1R_2R_3N \longrightarrow R_1R_2R_3N\cdot HX' + X\overset{X}{\underset{}{C}}=C=O$$

(1.)

$$X\text{—}\overset{X}{\underset{|}{C}}=C=O + \underset{HC}{\overset{HC\text{—}\text{—}CH}{\underset{\underset{C}{\underset{H_2}{}}}{\|}}}\underset{CH}{\overset{\|}{}} \longrightarrow X\text{—}\overset{\overset{X}{|}}{\underset{\underset{}{|}}{C}}\text{—}\overset{H}{\underset{}{C}}\text{—}\text{—}CH$$

(2.)

wherein X, and X' are halogen and $R_1$, $R_2$, and $R_3$ are monovalent alkyl radicals.

Dihaloacetyl halides which can be utilized to prepare dihaloketenes in accordance with the above-depicted equation are, in general, compounds represented by the following formula:

$$X\text{—}\underset{H}{\overset{X}{\underset{|}{C}}}\text{—}\overset{O}{\underset{}{\overset{\|}{C}}}\text{—}X'$$

wherein X and X' are each selected from the group consisting of fluorine, chlorine, bromine, and iodine. Preferably, X and X' are the same and are selected from the group consisting of chlorine and bromine.

Typical examples of dihaloacetyl halides include difluoroacetyl fluoride, dichloroacetyl chloride, difluoroacetyl chloride, difluoroacetyl bromide, diiodoacetyl chloride, dibromoacetyl fluoride, dibromoacetyl chloride, and dibromoacetyl bromide. Dichloroacetyl chloride is preferred.

Tertiary amines utilized in conjunction with the above-described dihaloacetyl halides are, in general, free from functional groups and soluble in the liquid medium chosen as the reaction medium. Moreover, it is preferred that the tertiary amines form relatively insoluble hydrohalides in the liquid reaction medium. However, while the simple, aliphatic tertiary amines are most preferred for preparing the dihaloketenes, any tertiary amine which is soluble in the liquid reaction medium and whose hydrohalide salt is substatially insoluble in the liquid reaction medium can be employed. Thus, tertiary amines which contain inert functional groups, e.g., tetramethyldiaminoethane and cyclic amines, such as pyridine and derivatives thereof, also can be used. By inert is meant that the functional group is chemically inert at the conditions under which the reaction proceeds.

Aliphatic tertiary amines which typically can be used can be depicted by the following formula:

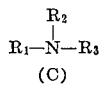

(C)

wherein $R_1$, $R_2$, and $R_3$ are each selected from the group consisting of $C_1$–$C_{10}$ alkyl, preferably, $C_1$–$C_5$ alkyl.

Suitable examples of various tertiary amines include trimethylamine, triethylamine, tri-n-propylamine, tri-n-butylamine, tri-n-octylamine, methyldiethylamine, methylethyl-n-propylamine, triisopropylamine, dimethyl-isopropylamine, dimethylbutylamine, dimethylisoamylamine, dimethylisooctylamine, dimethyloctylamine, methylethylisooctylamine, dimethyl-(2-ethyl)-propylamine, dimethyl-t-butylamine, dimethyloctadecylamine, pyridine, lutidine, collidine, picoline, N-methylmorpholine, dimethylaniline, etc. Preferably, simple tertiary aliphatic amines, such as triethylamine, and heterocyclic amines, such as pyridine end lutidine, are employed.

In general, the the mole ratio of tertiary amine to dihaloacetylhalide will vary between about 0.9:1 and about 1.05:1, and preferably, will be 1:1.

Cyclopentadiene is commercially available and is generally prepared by pyrolyzing dicyclopentadiene which is conventionally obtained from the cracking of hydrocarbon feedstocks.

The amount of cyclopentadiene employed can very over a broad range, e.g., from a fraction of a mole to 8–10 moles or more per mole of dihaloacetylhalide. When less than 1 mole of cyclopentadiene per mole of dihaloacetylhalide is employed, a portion of the dihaloketene generated polymerizes and the isolation of the desired bicycloheptenone becomes more complicated due to the difficulty of separation of the desired product from dihaloketene polymer. Preferably, the mole ratio of cyclopentadiene to dihaloacetylhalide ranges between about 1:1 and about 10:1, preferably about 2:1. Excess cyclopentadienes, i.e., over stoichiometric amounts, acts as a diluent for the reaction. No economic advantage is gained by utilizing a mole ratio greater than 10:1.

The liquid reaction medium in which dihalobicycloheptenones can be prepared is a non-aqueous liquid medium which, if not cyclopentadiene, is also chemically inert. To be considered inert, the liquid medium should contain no functional groups that are reactive with the reactants and products of the above-described reaction at the conditions the reaction proceeds. Preferably, the liquid reaction medium is also a non-solvent for the by-product amine hydrohalide. The amount of solvent employed can vary over a wide range, but, in general, should be about three times as great by weight as the tertiary amine hydrohalide by-product in order to facilitate agitation of the reaction medium.

Examples of suitable solvents includes: $C_4$–$C_{20}$ aliphatic hydrocarbons and chlorinated aliphatic hydrocarbons; $C_4$–$C_{12}$ alicyclics; $C_5$–$C_{10}$ aromatics and chlorinated aromatics; heterocyclic compounds; and ethers. Specific examples of the above include: n-butane, isobutane, pentane, hexane, isopentane, n-heptane, 2,2,3-trimethylbutane, n-octane, dodecane, pentadecane, and icosane; cyclobutane, methylcyclopropane, cyclopentane, cyclohexane, and cyclododecane; benzene, toluene, o,m,p-xylene, ethylbenzene, n-propylbenzene, isopropylbenzene, p-isopropyl-toluene, 1,2,3-trimethylbenzene, 1,2,4-trimethylbenzene, 1,3,5-trimethylbenzene tetrahydronaphthalene, and decahydronaphthalene; carbon tetrachloride, chloroform perchloroethylene, dichloromethane, and trichlorofluoromethane; o-dichlorobenzne, monochlorobenzene, 1,2,4-trichlorobenzene, 1,1,1 - trichloroethane, and 1,2 - dichloroethane; methylpropyl ether, di-n-propyl ether, di-n-butyl ether, diisopropyl ether, ethyl-n-butyl ether, and diethyl ether; 1,3-dioxolane, tetrahydrofuran, 4H-pyran, benzofuran, isobenzofuran, 2-methyl-tetrahydrofuran, 1,4-dioxane, dimethyl sulfoxide and dimethyl formamide.

The temperature at which dihalobicycloheptenones are prepared can vary over a wide range and, in general, will depend to a great extent upon the liquid reaction medium employed. Generally, temperatures between about −20° C. and about 50° C. are used. Preferably, temperatures between about 0° C. and about 20° C. are utilized. The pressure at which the reaction is carried out will generally be atmospheric; however, autogenous pressure suitably can be employed.

In a particular embodiment, triethylamine is added to a mixture of dichloroacetylchloride and cyclopentadiene in hexane at 0° C. Upon completion of the reaction, the liquid medium is filtered and distilled under vacuum to obtain dichlorobicycloheptenone.

The reaction between cyclopentadiene and ketene can be carried out in the conventional manner. Ketene, which is obtained in good yields from the pyrolysis of acetone, can be mixed with cyclopentadiene in substantially stoichiometric amounts in a suitable solvent at a temperature of about 100° C. to obtain the equimolar cycloaddition product, i.e., bicyclo[3.2.0]-2-hepten-6-one. Any of the solvents described hereinabove with respect to the preparation of the dihalobicycloheptenones can also be employed for this reaction.

Halogenation of the bicycloheptenones of the present invention can be conducted by any of the conventional methods described in the art. For example, direct halogenation with elemental halogen, hydrogen halides, or halogen-containing compounds with or without a suitable catalyst can be employed. In addition, halogen interchange, e.g., by the use of metal halides, or oxychlorination methods, can also be utilized.

Typical halogenating agents which can be employed include: the liquid halogens, e.g., liquid fluorine, chlorine, bromine, and iodine; the hydrogen halides (anhydrous as well as concentrated aqueous solutions thereof); sulfuryl chloride, phosgene, thionyl chloride, sulfuryl bromide, sulfuryl fluoride, antimony pentachloride, phosphorus pentachloride, phosphorus pentabromide, potassium bromide, iodine trichloride, iodine monochloride, sulfur dichloride, N-halo compounds such as, N-bromosuccinimide, N-bromophthalimide, N-bromoacetamide, N-chloroacetanilide; t-butyl hypochloride and trichloromethanesulfonyl chloride. Examples of metal halides include the fluorides of mercury, silver, antimony, potassium, zinc, calcium, cadmium, lead, cobalt and manganese and the iodides of sodium and potassium.

Conventional catalytic agents which can optionally be employed to aid halogenation include light ultraviolet light, peroxides, gamma radiation, strong mineral acids, e.g., $H_2SO_4$, and Lewis acids, e.g., $AlCl_3$ $SnCl_4$, and $FeCl_3$.

Halogenation can be performed over a fairly broad range of temperatures and pressures depending on the method and halogenating agent utilized. In general, temperatures between −40° C. and about 200° C. or higher can be used; however, in specific cases, e.g., bromination, temperatures will be more restricted. Thus, chlorination, depending on the method and halogenating agent can be performed in, for example, a range of about −40° C. to about 200° C., preferably from about −20° C. to about +100° C., while bromination is preferably conducted between −20° C. and about +10° C.

Suitable solvents or diluents can be employed during halogenation. If desired. Examples thereof include halogenated derivatives of the lower ($C_1$–$C_5$) aliphatic hydrocarbons, such as chlorocarbons, chlorofluorocarbons, and fluorocarbons, e.g., carbon tetrachloride, Freons, as exemplified by dichlorodifluoromethane and trifluorotrichloroethane, 1,1,1-trifluoro-2,2-dichloro-3,3,3 - difluorochloropropane; as well as other conventional diluents such as carbon bisulfide and homologues thereof.

It is therefore contemplated that any suitable halogenation method can be utilized to prepare the compositions of the present invention and it is not intended that the scope of the invention be limited by any particularly described method.

The extent of halogenation is controlled by conventionally known methods, e.g., limiting the quantity of halogenating agent employed, restricting the length of time the bicycloheptenone is in contact with the halogenating agent, and by the use of rate-determining factors, such as actinic light, gamma radiation ($Co^{60}$), peroxides or other free-radical initiators and heat.

The halogenated bicycloheptenone compositions of the present invention are believed to be represented by the following general structural formulae:

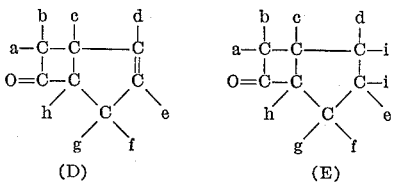

wherein substituents a, b, c, d, e, f g, h, and i are each selected from the group consisting of hydrogen and halogen, e.g., chlorine, bromine, iodine and fluorine, typically chlorine and bromine and wherein at least three of said substituents are halogen. More typical of the compositions of the present invention are those wherein a and b are chlorine or bromine and from 2 to 4 of substituents c through i are halogen, preferably chlorine and bromine. Referring to Formula A, depicted hereinabove, it readily can be seen that the type of halogen appended to the bicycloheptenone structure can be the same or different. For example, alpha, alpha-dichloro-bicycloheptenone can be chlorinated or brominated to introduce additional chlorine or bromine atoms into the bicycloheptenone structure. The number of halogen atoms that can be appended to the bicycloheptenone structure can vary from 1 to 10. In the case of the dihalobicycloheptenones, the number of halogen atoms added will vary from 1 to 8. When the carbon-carbon double bond in the bicycloheptenone is removed by the addition of a halogen molecule, the resultant compound is better termed as a "bicycloheptenone." However, since the exact halogenation mechanism or order of halogen addition and order of substitution is at present not conclusively established, the compounds of the present invention will be referred to as "halogenated bicycloheptenones."

As mentioned hereinabove, the extent of halogenation can be regulated by the amount of halogen employed, the type of halogenating agent, the contact time, etc. A completely halogenated bicycloheptanone or, as used herein, bicyclohepenone, contains 10 halogen atoms. Preferably, the bicycloheptenone contains from 4 to 10 halogen atoms, and more preferably, from 6 to 10 halogen atoms. Typically, the halogenated bicycloheptenone contains from 4 to 8 halogen atoms and usually from 6 to 8 halogen atoms.

Expressed in a different manner, the halogen-containing compositions of the present invention will typically contain between about 35 and about 90 weight percent halogen. Generally, the fluorinated bicycloheptenones will contain from about 35 to about 65 weight percent fluorine, chlorinated bicycloheptenones—from about 50 to about 78 weight percent chlorine, preferably from about 57 to 72 weight percent chlorine, brominated bicycloheptenones—from about 69 to about 89 weight percent bromine, preferably from about 75 to about 83 weight percent bromine; and iodinated bicycloheptenones—from about 80 to about 93 weight percent iodine. Bromo-chloro substituted bicycloheptenones typically contain from about 58 to about 75 weight percent of combined halogen. For example, an alpha, alpha-dichlorobicycloheptenone which has been chlorinated to introduce one additional chlorine atom onto the bicycloheptenone ring will contain about 50 percent chlorine. Total chlorination of this same compound, i.e., where 10 chlorine atoms are appended to the bicycloheptenone righ, yields a composition containing about 78 weight percent chlorine. Similarly, bromination of alpha, alpha-dichlorobicycloheptenone will produce compositions containing between about 58 and about 88 weight percent halogen.

The halogenated bicycloheptenones of the present invention can be formulated for application in an agricultural environment as either liquid or solid compositions, depending on the ultimate use. By dissolving the compositions of the present invention in various organic solvents, or oil-base extenders, liquid compositions are prepared. If desired, aqueous emulsions of these halogenated compositins can be prepared by incorporating conventional surface active wetting agents in the organic formulation, following which, water can be added. Solid formulations can be prepared by spraying organic solutions of the contemplated halogenated compositions and a volatile solvent or by spraying them in molten form onto finely-divided inert particles such as talc, diatomaceous earth, silica, calcium silicate, and the like. Moreover, wettable powders can be prepared by the use of a wetting agent. The exact formulations utilized are considered to be within the province of persons skilled in the art.

The amount of halogenated bicycloheptenone incorporated into the above-described formulations will vary over a broad range and will depend upon the type of formulation used, the organism against which the composition is employed and whether extenders or diluents are utilized to distribute the formulation. Generally, that amount which constitutes an effective (biocidal) amount or toxic dose will be used, i.e., an insecticidal, namatocidal, fungicidal, etc.

Typically, the present compositions are applied in the amounts of from about ¼ to about 10#/100 gallons of liquid spray means are used and from about ¼ to about 10#/acre when ground is treated directly. Expressed in another way, the median lethal dose ($LD_{50}$) can vary from 0.001 to 5 mg./gram of body weight.

The present invention is more particularly described in the following examples which are intended as illustrative only since numerous modifications and variations therein will be apparent to those skilled in the art.

Example I.—Preparation of 7,7-dichlorobicyclo[3.2.0]-2-hepten-6-one

Into a five thousand milliliter, three-necked flash fitted with a dropping funnel, Dry Ice-acetone reflux condenser, stirrer, and thermometer, and flushed with nitrogen were placed 955 milliliters of dry n-hexane. This was cooled to 0° C. and 828 grams (12.5 moles) of cyclopentadiene were added, together with 189 grams (1.28 moles) of dichloroacetylchloride. Then, 129 grams (1.277 moles) of triethylamine progressed, amine hydrochloride formed and to the reaction flask dropwise over a period of 4¾ hours. The temperature of the reaction was maintained between 0 and 5° C. by cooling in an ice bath. As the addition of triethylamine progressed, amine hydrochloride formed and the reaction mixture acquired a light pinkish-yellow color. The cream-yellow reaction mixture was then stirred 1½ hours at 0° C. and stored overnight at dry ice temperature. Thereafter, the reaction mixture was filtered and the filtrate topped in a rotary-film evaporator, first under aspirator and then under Hy-Vac pump vacuum. The residue from the topping was distilled in vacuo (0.2–0.3 millimeter of mercury) and the fraction boiling at 43 to 45° C. collected. This fraction was redistilled under a vacuum of 0.20–0.35 millimeter of mercury and the fraction boiling from 36–42° C. collected. This second fraction amounted to 147.2 grams (65 percent conversion). Chlorine analysis of the second fraction showed an average chlorine content of 40.13 percent. Theoretical chlorine content for the cycloaddition product of dichloroketene and cyclopentadiene is 40.15 perecnt. Analytical techniques, such as infra-red and NMR spectra, and elemental analysis confirm the bicycloheptenone structure and confirm the product of the second fraction is the result of the combination of one mole of cyclopentadiene and dichloroketene.

Example II.—Preparation of bicyclo[3.2.0]-2-hepten-6-one

Ketene, prepared from the pyrolysis of acetone, and cyclopentadiene are each dissolved in toluene and charged into a suitable reaction flask in a mole ratio of about 1:1. The temperature of the reaction is slowly brought to about 100° C. and held there for about 2 hours. Thereafter, the contents of the reaction flask are cooled to room temperature and the equimolar cycloaddition product of cyclopentadiene and ketene, which may be named bicyclo[3.2.0]-2-hepten-6-one, separated therefrom. Analytical techniques confirm the bicycloheptenone structure and confirm that the product is the result of the combination of one mole of ketene with one mole of cyclopentadiene.

Example III

Run No. 1.—Into a five hundred milliliter, three-necked flask equipped with magnetic stirrer, Dry Ice-acetone reflux condenser, fritted gas inlet tube and thermometer were placed a solution of 17.7 grams (0.1 mole) of the equimolar cycloaddition product of cyclopentadiene and dichloroketene in two hundred milliliters of carbon tetrachloride. The reaction mixture was protected from light by wrapping with aluminum foil. Thereafter, 1.5 grams of chlorine were admitted and stirring begun. After mixing for about 16 hours and refluxing for an additional 2 hours, an additional 0.5 gram of chlorine was added. A stream of nitrogen was then passed through the solution to remove any unreacted chlorine or hydrogen chloride that might have formed and the solvent (carbon tetrachloride) was removed in a rotary film evaporator. Vacuum distillation of the residue yielded a small fraction (62–85° C./0.2 millimeter of mercury) which had a refractive index of 1.5392 and analyzed for 52.5 percent chlorine. (Calculated for $C_7H_6OCl_3$: Cl, 50.2 percent.)

Run No. 2.—12.2 grams (0.069 mole) of the equimolar cyclopentadiene-dichloroketene cycloaddition product was dissolved in 138 milliliters of carbon tetrachloride. The solution was placed in a 200 milliliter round bottom (three-necked flask) equipped with magnetic stirrer, thermometer, reflux condenser and fritted glass inlet tube. 5.5 grams (0.077 mole) of chlorine was fed into the carbon tetrachloride solution over a period of 3 hours under illumination of a Hanovia ultraviolet lamp (3660 A. wavelength). Illumination was continued for 1.5 hours after chlorine addition. Thereafter, the carbon tetrachloride was removed under reduced pressure (25° C./20 milliliters of mercury) by means of a rotary-film evaporator. The product obtained consisted of 17.5 grams of a pale yellow liquid having a refractive index of 1.5462 and a chlorine content of 60.2 percent. The calculated chlorine content for $C_7H_6OCl_4$: Cl is 57.3 percent. An infrared spectrum of this product showed the characteristic carbonyl absorption at 1815 cm.$^{-1}$.

Run No. 3.—Into a 500 milliliter, three-necked flask equipped with stirrer, Dry Ice-acetone condenser, and thermometer was placed a solution of 17.7 grams (0.1 mole) of the equimolar cycloaddition product of cyclopentadiene and dichloroketene in 200 milliliters of carbon tetrachloride. The flask was radiated with a Hanovia ultraviolet lamp and gaseous chlorine passed through the solution. During the chlorine addition, the temperature of the flask was not permitted to rise above 35° C. After a total of 38.1 grams of chlorine was passed into the solution, the Dry Ice-acetone condenser was replaced with a water condenser and a current of nitrogen passed through the solution to remove any unreacted dissolved chlorine and any hydrogen chloride. Carbon tetrachloride was removed by topping in a rotary-film evaporator at 45° C. The resultant product was a nearly colorless heavy oil weighing 31.7 grams and had a chlorine content of 68.9 percent. The calculated chlorine content for $C_7H_4OCl_6$: Cl is 67.2 percent. An infrared spectrum of this material exhibited the characteristic carbonyl band at about 1815 cm.$^{-1}$.

Run No. 4.—A solution of 10 grams (0.0315 mole) of the chlorinated product prepared in Run No. 3 in 120 milliliters of carbon tetrachloride was placed in a 300 milliliter, three-necked flask equipped with a water condenser, surmounted by a Dry Ice-acetone condenser, a fritter inlet tube and a magnetic stirrer. The system was then swept with nitrogen and about 3.7 grams of chlorine was admitted. The temperature of the flask was then raised to the boiling point of the solution and the reaction mixture irradiated with Blak-Ray long wave (3,600 A. wavelength) ultraviolet lamp. The reaction mixture was stirred under irradiation for 2½ hours. Additional chlorine was then added and refluxing resumed. After 2½ hours, a total of 6.5 grams of chlorine had been introduced. Stirring was continued for 3 more hours until little chlorine was present in the system. The reaction mixture was then flushed with nitrogen to remove hydrogen chloride and any unreacted chlorine. Carbon tetrachloride was removed in a rotary-film evaporator in a similar manner as performed in Run No. 3. The residue weighed 10.4 grams and was similar in odor and physical appearance to the product obtained in Run No. 3. Chlorine analysis of this product showed it to contain 71.7 percent chlorine. The calculated chlorine analysis for $C_7H_3OCl_7$: Cl is 70.8 weight percent. An infrared spectrum of this product showed the characteristic carbonyl band at 1815 cm.$^{-1}$.

Example IV

Into a 200 milliliter three-necked flask is placed 17.7 grams (0.1 mole) of the equimolar cycloaddition product of cyclopentadiene and dichloroketene dissolved in 60 milliliters of chloroform. The mixture is stirred and cooled at 0° C. in an ice-salt bath. Addition of 16 grams (0.1 mole) of bromine from a dropping funnel is spread over 1.5 hours in order to maintain the reaction temperature below 5° C. After stirring for another half hour, the mixture is washed successively with dilute sodium sulfite solution, dilute sodium carbonate solution, and then dried over $MgSO_4$. Solvent and lower boiling components are removed under reduced pressure, leaving 27.6 grams (82 percent yield) of a yellow oil. Analysis of the product is consistent with the formula: $C_7H_6Br_2Cl_2O$.

Example V

Into a 200 milliliter three-necked flask are placed 21.6 grams (0.2 mole) of the equimolar cycloaddition product of ketene and cyclopentadiene and 1 gram of ferric chloride as catalyst. With vigorous stirring, 50 grams of chlorine gas (0.7 mole) is introduced below the liquid surface over two hours, while the temperature of the surrounding oil bath is gradually raised to 120° C. Excess chlorine is then removed by a stream of nitrogen gas. The catalyst is washed out with dilute hydrochloric acid, followed by washing with dilute NaHCO$_3$ solution. The volatile constituents are removed from the product mixture under greatly reduced pressure, leaving 42.3 grams (75 percent yield) of a pale oil having a calculated chlorine content of 62.8 percent. Analysis of the product is consistent with the formula: $C_7H_5Cl_5O$.

Example VI

Into a 200 milliliter three-necked flask are placed 26.6 grams (0.1 mole) of the 1:1 cycloaddition product of cyclopentadiene and dibromoketene dissolved in 60 milliliters of chloroform. The solution is stirred and cooled to 0° C. in an ice-salt bath. Using a tungsten filament lamp as source of radiant energy, 16 grams (0.1 mole) of bromine are added over one hour from a dropping funnel. Stirring is applied throughout the reaction and the addition of bromine performed slowly. The flask temperature is kept below 5° C. The product solution is washed successively with water, dilute sodium sulfite solution, and dilute sodium carbonate solution. After drying over anhydrous calcium chloride, the solvent is stripped off under reduced pressure leaving 39 grams (91.5 percent yield) of an orange-colored oil. The calculated bromine content is 75.12 percent. Analysis of the product is consistent with the formula: $C_7H_6Br_4O$.

Example VIII

A solution of 2.5 weight percent in acetone of the chlorinated adduct prepared in Example III, Run No. 3, (68.9 percent chlorine) was prepared. Two microliters of this solution were applied topically to the thorax of 30 non-resistant houseflies. Three Petri dishes of 10 houseflies each constituted the test run. As a control, 10 flies were placed in a Petri dish with a wick soaked in milk. After 24 hours, the percent mortality was determined and reported. None of the noninoculated flies, i.e., those in the Petri dish containing the wick soaked in milk, expired. Fifty-three percent of the inoculated flies contained in the other three Petri dishes expired.

Example IX

The chlorinated adduct of Example III, Run No. 3, was tested for fungicidal activity. In this test, two fungi, *Monilia fructicola*, the causal organism of brown rot of stone fruit, and *Alternari solani*, the causal organism of early blight of tomato and potato, were used as the test fungi. Spores of the respective fungi were suspended in 38 milliliters of distilled water containing two milliliters of orange juice. Solutions of the organic compound to be tested were prepared in about 0.1 weight percent and between about 0.01 and about 0.1 percent. Equal portions of each of the spore suspensions were added to each of the two test chemical solutions. Two drops of each mixture were placed n a clean glass slide and incubated at 23° C. for 21 for 24 hours. At the end of the incubation period, the control (a spore suspension in distilled water and orange juice) and test solutions were read for percent germination. A spore is considered to have germinated if the length of the germ tube is at least the diameter of the spore. The results for this series of fungicidal tests are tabulated in Table I.

TABLE I

| Organism compound concentration | Alternaria | | Monilia | |
|---|---|---|---|---|
| | 0.1% | 0.01-0.1% | 0.1% | 0.01-0.1% |
| Chlorinated adduct (Ex. III, Run No. 3). | − | − | − | − |
| Control | + | + | + | + |

In Table I, the plus (+) is employed to indicate the fungi germinated. A minus (−) is employed to indicate that the fungi did not germinate. The data of Table I show that the chlorinated adduct of Example III, Run No. 3, was successful in inhibiting the germination of both test fungi.

Example X

The chlorinated adduct of Example III, Run No. 3 was tested for nematocidal activity. In this test, the nematode, a species of Panagrellus, is added to a stock solution of test chemical of predetermined concentrations. In this example, the test organism was added to a stock solution of the chlorinated cyclopentadiene-dichloroketene adduct referred to above so that the final concentration of 0.01 weight percent over a 24-hour period. percent. Observation of these tests showed that the chlorinated adduct employed as the test chemical produced a 100 percent mortality rate at 0.1 weight percent concentration and a 90 percent mortality rate at a concentration of 0.01 weight percent over a 24-hour period.

Example XI

The chlorinated adduct of Example III, Run No. 4, was tested for miticidal activity by subjecting strawberring spider mites to various dosages of the chlorinated adduct. Results of the experiment show that the test compound exhibits ability to control this spider mite.

EXAMPLE XII

A 250 milliliter, three-necked flask, fitted with magnetic stirring bar, reflux condenser vented to a drying tube filled with Drierite, addition funnel and gas inlet tube is charged with about 0.05 mole (8.9 grams) of the cycloaddition product of dichloroketene and cyclopentadiene dissolved in 50 milliliters of carbon tetrachloride. Bromine (8 grams—0.05 mole) dissolved in 25 milliliters of carbon tetrachloride is placed in the addition funnel and the entire apparatus is wrapped in aluminum foil and placed in a darkened room. The bromine solution is slowly added to the stirred reaction mixture at room temperature. After completion of the addition, dry nitrogen is passed through the solution for about 30 minutes and then, while still avoiding exposure to bright light, the solution is concentrated at room temperature using a rotary film evaporator. Analysis of the residue confirms the product to be the result of the addition of bromine across the double bond of the cyclopentadiene moiety. The infra-red spectrum shows the characteristic carbonyl absorption at 1815 cm.$^{-1}$. Elemental analysis of the residue is consistent with the formula $C_7H_6Cl_2Br_2O$.

Example XIII

The procedure of Example XII is repeated except that 40 grams (0.25 mole) of bromine in 100 milliliters of carbon tetrachloride is used and the reaction flask is not shielded from light. Analysis of the product residue is consistent with the pentabromo derivative of the dichloroketene-cyclopentadiene cycloaddition product, i.e.,

$$C_7H_3Cl_2Br_5O$$

The infra-red spectrum shows the characteristic carbonyl absorption at 1815 cm.$^{-1}$.

Example XIV

A 2.5 gram portion of the product fraction of Example III, Run No. 2 (about 0.01 mole) i.e., the chlorinated dichloroketene-cyclopentadiene cycloaddition product corresponding essentially to $C_7H_6OCl_4$, is dissolved in 10 milliliters of carbon tetrachloride and is placed in a 100 milliliter reaction flask fitted with magnetic stirring bar, addition funnel and reflux condenser vented to a drying ture is exposed to ordinary laboratory light. After comdissolved in 50 milliliters of carbon tetrachloride is placed in the addition funnel and is added slowly to the stirred reaction mixture at room temperature. The reaction mixture is exposed to ordinary laborator light. After completion of the bromine addition, the reaction mixture is stirred an additional hour, followed by purging with dry nitrogen, and finally is concentrated at room temperature using a rotary film evaporator. Analysis of the product residue is consistent with the tetrabromo derivative of the starting material, i.e., $C_7H_2Cl_4Br_4O$. The infra-red spectrum shows the characteristic carbonyl absorption at 1815 cm.$^{-1}$.

Example XV

A 250-milliliter, three-necked flask was fitted with a reflux condenser, thermometer, magnetic stirring bar and a bubbler connected to a gas cylinder. The flask was charged with 8.9 grams (0.050 mole) of the equimolar cycloaddition product of dichloroketene and cyclopentadiene in 50 milliliters of carbon tetrachloride. The flask was then covered with aluminum foil to keep out light. Chlorine was bubbled in slowly with constant stirring. The temperature rose only a few degrees. After 18 grams of chlorine were added, the reaction mixture was allowed to stand overnight. The solution was then purged with nitrogen for thirty minutes and topped with a rotary film evaporator operated at about 40° C. and about 40 millimeters of mercury to obtain 11.4 grams of a pale, yellow oil. This oil product was subjected to vacuum distillation through a 6-inch Vigreaux column at 0.25 millimeters of mercury. Two pale yellow fractions were collected. The first fraction (2.6 grams) was collected at 59–70° C. and the second fraction (4.9 grams) at 70–90° C. Most of the material in the second fraction was collected at 88–90° C. Analysis of the second fraction was consistent with the product $C_7H_6Cl_4O$, i.e., 2,3,7,7-tetrachlorobicyclo-[3.2.0]heptan-6-one.

*Analysis.*—Calculated for $C_7H_6Cl_4O$ (percent): carbon 33.9; hydrogen 2.4; chlorine 57.2. Found (percent): carbon 34.2; hydrogen 2.4; chlorine 57.8. This product is believed to be represented by the following formula:

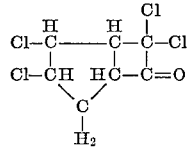

Example XVI

The brominated product of Example XII is tested as a soil fungicide for *Fusarium solani* in a sealed soil blender at a concentration of 100 p.p.m. and as an insecticide for houseflies at a concentration of 1000 p.p.m. and is found to be active in both tests.

Example XVII

The brominated product of Example XIII is tested as a soil fungicide for *Sclerotium rolfsii* and *Fusarium solani* at concentrations of 100 p.p.m. and as an insecticide for Two-Spotted Spider Mites at a concentration of 1000 p.p.m. and is found to be active in both tests.

Example XVIII

The brominated product of Example XIV is tested as a soil fungicide for *Rhizoctonia solani* at a concentration of 100 p.p.m. as a nematocide for *Meloidogyne incognita* at a concentration of 100 p.p.m., and as an insecticide for Mexican bean beetles at a concentration of 1000 p.p.m. and is found to be active in all tests.

Example XIX

The chlorinated equimolar adduct of cyclopentadiene and dichloroketene of Example III, Run No. 2 was tested for fungicidal activity for *Monilia fructicola* and *Alternaria solani* as in Example IX and was found to be active. The chlorinated adduct was also tested for nematocidal activity for the species Panogrellus as in Example X and as an insecticide for houseflies as in Example VIII and found to be active in both tests.

While there are above described a number of specific embodiments of the present invention, it is obviously possible to produce other embodiments and various equivalent modifications thereof without departing from the spirit of the invention.

Having set forth the general nature and specific embodiments of the present invention, the true scope is now particularly pointed out in the appended claims.

What is claimed is:

1. A composition comprising a diluent and a biocidal concentration of halogenated bicycloheptenone selected from the group consisting of chlorinated and brominated bicycloheptenone prepared by reacting bicycloheptenone represented by the formula:

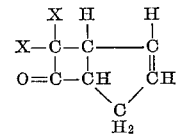

wherein X is hydrogen, chlorine or bromine, with halogen selected from the group consisting of chlorine and bromine at temperatures of between about −20° C. and about 100° C., and about −20° C. and about 10° C. respectively, said halogenated bicycloheptenone having at least four halogen substituents.

2. A composition according to claim 1 wherein said halogenated bicycloheptenone is a chlorinated bicycloheptenone having from 6 to 8 chlorine substituents.

3. A method of combatting insects which comprises treating insects with a composition comprising an insecticidal concentration of chlorinated bicycloheptenone prepared by chlorinating, at temperatures between about −20° C. and about 100° C., bicycloheptenone represented by the formula:

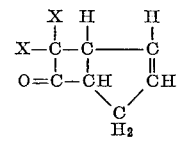

wherein X is hydrogen or chlorine, said chlorinated bicycloheptenone having at least four chlorine substituents.

4. The method of claim 3 wherein said chlorinated bicycloheptenone has from 6 to 8 chlorine substituents.

5. A method of controlling fungi which comprises contacting fungi with a composition comprising a fungicidal amount of chlorinated bicycloheptenone prepared by chlorinating, at temperatures between about −20° C. and about 100° C., bicycloheptenone represented by the formula:

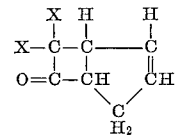

wherein X is hydrogen or chlorine, said chlorinated bicycloheptenone having at least four chlorine substituents.

6. A method of controlling nematodes which comprises introducing into at least the surface layer of soil containing said nematodes in an amount sufficient to control such nematodes, an agricultural composition comprising an inert carrier and chlorinated bicycloheptenone prepared by chlorinating, at temperatures between about −20° C. and about 100° C., bicycloheptenone represented by the formula:

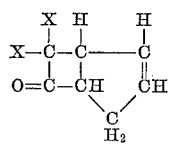

wherein X is hydrogen or chlorine, said chlorinated bicycloheptenone having at least four chlorine substituents.

7. A method of combatting mites which comprises treating mites with a miticidal amount of a composition comprising an inert carrier and chlorinated bicycloheptenone prepared by chlorinating, at temperatures between about −20° C. and about 100° C., bicycloheptenone represented by the formula:

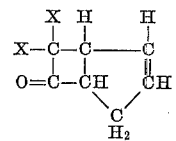

wherein X is hydrogen or chlorine, said chlorinated bicycloheptenone having at least four chlorine substituents.

References Cited

Roedig et al.: ANN. 598: 214,217 (1956).
Stevens et al.: J.A.C.S. 87: 5257–5259 (1965).

SHEP K. ROSE, Primary Examiner